[12] United States Patent
Kelsey et al.

(10) Patent No.: US 7,925,869 B2
(45) Date of Patent: Apr. 12, 2011

(54) INSTRUCTION-LEVEL MULTITHREADING ACCORDING TO A PREDETERMINED FIXED SCHEDULE IN AN EMBEDDED PROCESSOR USING ZERO-TIME CONTEXT SWITCHING

(75) Inventors: Nicholas J Kelsey, Mountain View, CA (US); Christopher J Waters, Palo Alto, CA (US); Tibet Mimaroglu, Sunnyvale, CA (US); David A Fotland, San Jose, CA (US)

(73) Assignee: Ubicom, Inc., San Jose, CA (US)

( * ) Notice: Subject to any disclaimer, the term of this patent is extended or adjusted under 35 U.S.C. 154(b) by 185 days.

(21) Appl. No.: 09/748,098

(22) Filed: Dec. 21, 2000

(65) Prior Publication Data

US 2002/0002667 A1 Jan. 3, 2002

Related U.S. Application Data

(60) Provisional application No. 60/171,731, filed on Dec. 22, 1999, provisional application No. 60/213,745, filed on Jun. 22, 2000, provisional application No. 60/250,781, filed on Dec. 1, 2000.

(51) Int. Cl.
*G06F 9/00* (2006.01)
(52) U.S. Cl. ...................................... 712/220
(58) Field of Classification Search .................. 712/228, 712/43, 229; 718/102, 103, 107, 108
See application file for complete search history.

(56) References Cited

U.S. PATENT DOCUMENTS

| | | | |
|---|---|---|---|
| 4,110,831 A | 8/1978 | Langdon, Jr. | |
| 4,777,587 A | 10/1988 | Case et al. | |
| 4,821,187 A | 4/1989 | Ueda et al. | 364/200 |
| 4,825,355 A | 4/1989 | Kurakazu et al. | |
| 4,939,735 A | 7/1990 | Fredericks et al. | |
| 5,163,146 A | 11/1992 | Antanaitis, Jr. et al. | |
| 5,179,672 A | 1/1993 | Genduso et al. | |
| 5,247,636 A | 9/1993 | Minnick et al. | |
| 5,260,703 A | 11/1993 | Nguyen et al. | |
| 5,317,701 A | 5/1994 | Reininger et al. | |
| 5,361,337 A | 11/1994 | Okin | |
| 5,392,435 A | 2/1995 | Masui et al. | |
| 5,404,469 A * | 4/1995 | Chung et al. | 712/215 |
| 5,410,658 A | 4/1995 | Sawase et al. | 395/375 |

(Continued)

FOREIGN PATENT DOCUMENTS

WO WO 99/21081 A1 4/1999

(Continued)

OTHER PUBLICATIONS

"Dynamic Scheduling of Hard Real-Time Tasks and Real-Time Threads", Schwan et al., Aug. 1992, IEEE Transactions on Software Engineering, vol. 18, No. 8., pp. 736-748.*

(Continued)

*Primary Examiner* — David J Huisman
(74) *Attorney, Agent, or Firm* — Fenwick & West LLP

(57) ABSTRACT

A system and method for enabling multithreading in a embedded processor, invoking zero-time context switching in a multithreading environment, scheduling multiple threads to permit numerous hard-real time and non-real time priority levels, fetching data and instructions from multiple memory blocks in a multithreading environment, and enabling a particular thread to modify the multiple states of the multiple threads in the processor core.

55 Claims, 13 Drawing Sheets

Time

U.S. PATENT DOCUMENTS

| | | | |
|---|---|---|---|
| 5,430,884 A | | 7/1995 | Beard et al. |
| 5,515,538 A | | 5/1996 | Kleiman |
| 5,524,250 A | | 6/1996 | Chesson et al. |
| 5,553,305 A | | 9/1996 | Gregor et al. |
| 5,655,133 A | | 8/1997 | Dupree et al. |
| 5,727,211 A | | 3/1998 | Gulsen |
| 5,761,470 A | | 6/1998 | Yoshida |
| 5,865,624 A | | 2/1999 | Hayashigawa |
| 5,867,725 A | | 2/1999 | Fung et al. ............... 395/800.23 |
| 5,907,694 A | | 5/1999 | Suzuki et al. |
| 5,933,627 A | | 8/1999 | Parady |
| 5,933,650 A | | 8/1999 | van Hook et al. |
| 5,944,816 A | | 8/1999 | Dutton et al. .................. 712/215 |
| 6,009,505 A | | 12/1999 | Thayer et al. |
| 6,016,542 A | | 1/2000 | Gottlieb et al. |
| 6,026,503 A | * | 2/2000 | Gutgold et al. .................. 714/45 |
| 6,061,710 A | | 5/2000 | Eickemeyer et al. |
| 6,076,157 A | * | 6/2000 | Borkenhagen et al. ........ 712/228 |
| 6,085,215 A | * | 7/2000 | Ramakrishnan et al. ...... 718/102 |
| 6,163,839 A | | 12/2000 | Janik et al. |
| 6,314,511 B2 | * | 11/2001 | Levy et al. ..................... 712/217 |
| 6,317,774 B1 | * | 11/2001 | Jones et al. .................... 709/107 |
| 6,366,998 B1 | | 4/2002 | Mohamed |
| 6,374,286 B1 | * | 4/2002 | Gee et al. ....................... 718/108 |
| 6,378,018 B1 | | 4/2002 | Tsern et al. |
| 6,385,713 B2 | | 5/2002 | Yung |
| 6,421,701 B1 | | 7/2002 | Elnozahy |
| 6,460,116 B1 | | 10/2002 | Mahalingaiah |
| 6,493,741 B1 | * | 12/2002 | Emer et al. ..................... 718/107 |
| 6,542,991 B1 | | 4/2003 | Joy et al. |
| 6,567,839 B1 | * | 5/2003 | Borkenhagen et al. ........ 709/103 |
| 6,694,425 B1 | | 2/2004 | Eickemeyer |
| 6,718,360 B1 | | 4/2004 | Jones et al. |
| 6,725,355 B1 | | 4/2004 | Imamura |
| 6,728,722 B1 | | 4/2004 | Shaylor |
| 6,766,515 B1 | | 7/2004 | Bitar et al. |
| 2003/0037228 A1 | | 2/2003 | Kelsey et al. |
| 2003/0110344 A1 | | 6/2003 | Szczepanek et al. |
| 2004/0087839 A1 | | 5/2004 | Raymond et al. |

FOREIGN PATENT DOCUMENTS

WO        WO 99/54813        10/1999

OTHER PUBLICATIONS

Binns, "A Robust High-Performance Time Partintioning Algorithm: The Digital Engine Operating System (DEOS) Approach," 2001, pp. 1.B.6-1.B.6-12.*

Shaaban, Clock Signals & Synchronous Sequential Circuits, Jan. 9, 2002, p. 5.*

Wikipedia—The Free Encyclopedia (entry: Clock Cycle), 2007, pp. 1-2.*

Free Online Dictionary of Computing (FOLDOC), Definition of "Cycle", 1997.*

McCrackin et al., "Using Horizontal Prefetching to Circumvent the Jump Problem", 1991, pp. 1287-1291.*

Culler et al., "Parallel Computer Architecture—A Hardware/Software Approach", Aug. 24, 1998, pp. 917-918.*

Nemirovsky, Dr. Mario Daniel; Brewer, Dr. Forrest; and Wood, Dr. Roger C.; DISC: Dynamic Instruction Stream Computer; 1991; ACM; pp. 163-171.

Intel Corporation, Pentium Processor Family Developer's Manual, vol. 3: Architecture and Programming Manual, 1995, pp. 25-1 and 25-30.

Eggers, Susan J., "Simultaneous Multithreading: A Platform for Next-Generation Processors", IEEE Micro, Sep. Oct. 1997, pp. 12-19.

El-Kharashi, et al., Multithreaded Processors: The Upcoming Generation for Multimedia Chips, 1998 IEEE Symposium on Advances in Digital Filtering and Signal Processing, Jun. 5-6, 1998, pp. 111-115.

8-bit AVR® Microcontroller with 128 K Bytes In-System Programmable Flash—Atmega103/103L—Preliminary; ATMEL; ® Atmel Corporation 2000; pp. 1-126.

Lindsay, S.K. et al., "On the Performance of a Multi-Threaded RISC Architecture," Electrical and Computer Engineering, Sep. 1993, pp. 369-372, vol. 1.

Notification of Transmittal of the International Search Report, PCT/US00/35242, Apr. 27, 2001, 4 pages.

Supplementary European Search Report, EP 00989474, Nov. 23, 2004, 3 pages.

Gschwind, M. et al., "High Frequency Pipeline Architecture Using the Recirculation Buffer," IBM Research Report, IBM Research Division, Mar. 19, 2001, pp. 1-25.

Stritter, E. et al., "A Microprocessor Architecture for a Changing World: The Motorola 68000," Feb. 1979, IEEE, pp. 42-52.

Japanese Office Action, Japanese Application No. 2001-547274, Jul. 13, 2010, 5 pages.

* cited by examiner

INSTRUCTION-LEVEL MULTITHREADING ACCORDING TO A PREDETERMINED FIXED SCHEDULE IN AN EMBEDDED PROCESSOR USING ZERO-TIME CONTEXT SWITCHING

RELATED APPLICATIONS

This application claims priority from U.S. provisional application No. 60/171,731 filed on Dec. 22, 1999 U.S. provisional application No. 60/213,745 filed on Jun. 22, 2000, and U.S. provisional application No. 60/250,781 filed on Dec. 1, 2000, which are all incorporated by reference herein in their entirety.

BACKGROUND OF THE INVENTION

1. Field of the Invention

The invention relates to the field of embedded processor architecture.

2. Description of Background Art

Conventional embedded processors, e.g., microcontrollers, support only a single hard real-time asynchronous process since they can only respond to a single interrupt at a time. Most software implementations of hardware functions—called virtual peripherals (VPs)—respond asynchronously and thus their interrupts are asynchronous. Some examples of VPs include an Ethernet peripheral (e.g., 100 Mbit and 10 Mbit Transmit and receive rates); High-speed serial standards peripherals, e.g., 12 Mbps USB, IEEE-1394 Firewire Voice Processing and Compression: ADPCM, G.729, Acoustical Echo Cancellation (AEC); an image processing peripheral; a modem; a wireless peripheral, e.g., an IRDA (1.5 and 4 Mbps), and Bluetooth compatible system. These VPs can be used as part of a Home programmable network access (PNA) system, a voice over internet protocol (VoIP) system, and various digital subscriber line systems, e.g., asymmetric digital subscriber line (ADSL), as well as traditional embedded system applications such as machine control.

An interrupt is a signal to the central processing unit (CPU) indicating that an event has occurred. Conventional embedded processors support various types of interrupts including external hardware interrupts, timer interrupts and software interrupts. In conventional systems, when an interrupt occurs the central processing unit (CPU) completes the current instruction, saves the CPU context (at a minimum the CPU saves the program counter), and jumps to the address of the interrupt service routine (ISR) that responds to the interrupt. When the ISR is complete and the interrupt has been responded to, the CPU executes a return-from-interrupt instruction and restores the CPU context and continues executing the main code from where the code was interrupted.

If multiple interrupts are received the CPU must be capable of servicing them. In one conventional system, if a second interrupt occurs during the processing of a first interrupt the second interrupt is ignored until the first interrupt is serviced. FIG. 1 is an illustration of a conventional interrupt response. The "main" code is interrupted by a first interrupt "A INT" and the CPU then processes the ISR for this interrupt (ISR A). The second interrupt (B INT) is received while the first interrupt is being processed. In this conventional system the ISR for the second interrupt does not begin until the ISR for the first interrupt is completed.

In another conventional system two levels of interrupt priority are utilized with the rule that a higher priority interrupt can interrupt a lower priority interrupt but riot an equal priority interrupt.

Embedded processors have a number of interrupt sources and so there must be some way of selecting which sources can interrupt the processor. In conventional systems this is done by using control (mask) registers to select the desired interrupt sources.

As described above, when an interrupt occurs the CPU loads the appropriate interrupt service routine (ISR) address into the program-counter. One implementation of this is to use the interrupt number as an index into random access memory (RAM), e.g., using an interrupt-vector-table, to find the dynamic ISR address (such as used in an Intel's 8×86 processors). The size of the interrupt-vector-table is normally limited by having a limited number of interrupts or by grouping interrupts together to use the same address. Grouped interrupts are then further analyzed to determine the source of the interrupt.

A problem with processing one or more interrupts is that, as described above, the context of the CPU must be stored before the interrupt is processed. This is necessary in order for the CPU to be able to continue processing after the ISR from the same position it was in before the interrupt was received. The storing of the context information such as the program counter and other various registers usually takes at least one clock cycle, and often many more. This delay reduces the effective processing speed of the CPU.

Context storing is used in many conventional processors, e.g., RISC based processors, and includes a single register set, e.g., 32 registers (RO to R31). These registers are often insufficient for a desired processing task. Accordingly, the processor must save and restore the register values frequently in order to switch contexts. Switching contexts may occur when servicing an interrupt or when switching to another program thread in a multithreading environment. The old context values are saved onto a stack using instructions, the context is switched, and then the previous context for the new thread is restored by pulling its values off the stack using instructions. This causes a variety of problems including (1) significantly reducing the performance of the processor because of the need to frequently save and restore operation for each context switch, and (2) preventing some time critical tasks from executing properly because of the overhead required to switch contexts.

For example, if a program needs to read a port location for capturing its value every 100 clock cycles and presuming the read operation takes only 5 clock cycles then if it requires 32 registers to save and restore for the context switch and the save operation and the restore operation each require two instructions for each register then the context switch and restoration requires 128 instructions which prevents the successful completion of the task since the read operation must occur every 100 clock cycles.

Conventional systems have attempted to resolve the problem by using dedicated hardware for time critical tasks or by using a front-end dedicated logic to capture the data and put it in a first in first out (FIFO) buffer to be processed by software. Several problems with these techniques are (1) they require dedicated front-end logic, and (2) they require more memory, e.g., FIFO, which increases die space and cannot be used for any other function.

Another problem with conventional embedded processing systems for processing interrupts is that interrupts that have critical timing requirements may fail. With reference to FIG. 1, if interrupt A and interrupt B are both time-critical, they may be scheduled such that they both have a high priority (if priorities are available) and although interrupt A is processed in a timely manner, interrupt B is not processed until after interrupt A has been processed. This delay may cause interrupt B to fail since it is not processed in a predefined time. That is, conventional systems do not provide reasonable certainty regarding when an interrupt will be processed.

An embedded processor is a processor that is used for specific functions. Embedded processors generally have some memory and peripheral functions integrated on-chip. Conventional embedded processors have not been capable of operating using multiple hardware threads.

A pipelined processor is a processor that begins executing a second instruction before the first instruction has completed execution. That is, several instructions are in a "pipeline" simultaneously, each at a different stage. FIG. 3 is an illustration of a conventional pipeline.

The fetch stage (F) fetches instructions from memory, usually one instruction is fetched per cycle. The decode stage (D) reveals the instruction function to be performed and identifies the resources needed. Resources include general-purpose registers, buses, and functional units. The issue stage (I) reserves resources. For example, pipeline control interlocks are maintained at this stage. The operands are also read from registers during the issue stage. The instructions are executed in one of potentially several execute stages (E). The last writeback stage (W) is used to write results into registers.

A problem with conventional pipelined processors is that because the speed of CPUs is increasing, it is increasingly difficult to fetch instruction opcodes from flash memory without having wait-states or without stalling the instruction pipeline. A faster memory, e.g., static RAM (SRAM) could be used to increase instruction fetch times but requires significantly more space and power on the embedded processor. Some conventional systems have attempted to overcome this problem using a variety of techniques. One such technique is to fetch and execute from flash memory. This technique would limit the execution speed of conventional processors, e.g., to 40 million instructions per second (MIPS) which is unacceptable in many applications.

Another technique is to load the program code into fast SRAM from flash memory or other non-volatile memory and then to execute all program code directly from SRAM. As described above, the problem with this solution is that the SRAM requires significantly more space on the die (approximately five times the space necessary for comparable flash memory) and requires significantly more power to operate.

A third technique is to use flash memory and SRAM cache. When the program reference is within the SRAM, then full speed execution is possible, but otherwise a cache miss occurs that leads to a long wait during the next cache load. Such a system results in unpredictable and undeterministic execution time that is generally unacceptable for processors that are real-time constrained. The real-time constraints are imposed by the requirement to meet the timing required by standards such as IEEE 802.3 (Ethernet), USB, HomePNA 1.1 or SPI (Serial Peripheral Interface). These standards require that a response be generated within a fixed amount of time from an event occurring.

What is needed is a system and method that (1) enables multithreading in a embedded processor, (2) invokes zero-time context switching in a multithreading environment, (3) schedules multiple threads to permit numerous hard-real time and non-real time priority levels, (4) fetches data and instructions from multiple memory blocks in a multithreading environment, and (5) enables a particular thread to store multiple states of the multiple threads in the instruction pipeline.

This invention can also be used with digital signal processors (DSP) where the invention has the advantages of allowing smaller memory buffers, a faster response time and a reduced input to output time delay.

SUMMARY OF THE INVENTION

The invention is a system and method for the enabling multithreading in a embedded processor, invoking zero-time context switching in a multithreading environment, scheduling multiple hardware threads to permit numerous hard-real time and non-real time priority levels, fetching data and instructions from multiple memory blocks in a multithreading environment, and enabling a particular thread to store multiple states of the multiple threads in the instruction pipeline.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

The present invention is a system and method that solves the above identified problems. Specifically, the present invention enables multithreading in a embedded processor, invokes zero-time context switching in a multithreading environment, schedules multiple threads to permit numerous hard-real time and non-real time priority levels, fetches data and instructions from multiple memory blocks in a multithreading environment, and enables a particular thread to store multiple states of the multiple threads in the instruction pipeline.

The present invention overcomes the limitations of conventional embedded processors by enabling multiple program threads to appear to execute concurrently on a single processor while permitting the automatic switching of execution between threads. The present invention accomplishes this by having zero-time context switching capabilities, an automatic thread scheduler, and fetching code from multiple types of memory, e.g., SRAM and flash memory. The appearance of concurrent execution is achieved by time-division multiplexing of the processor pipeline between the available threads.

Figure 1:
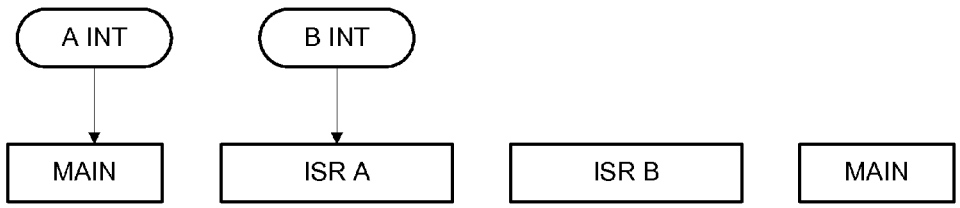
FIG. 1 is an illustration of a conventional interrupt response.
Figure 2:
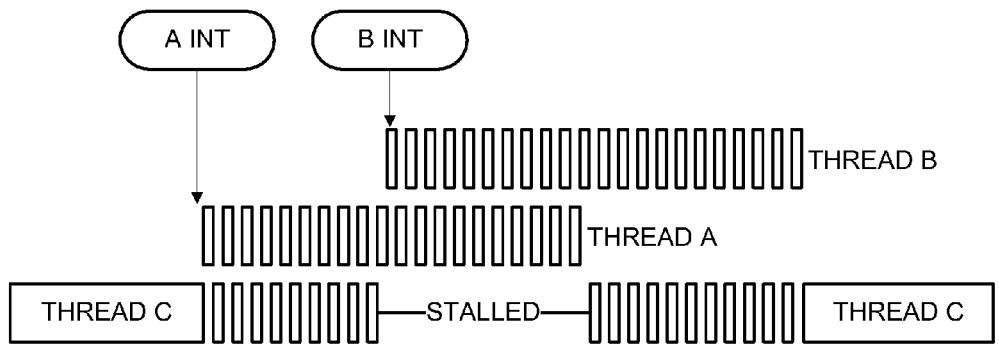
FIG. 2 is an illustration of an interrupt response in a multithreaded environment.
Figure 3:
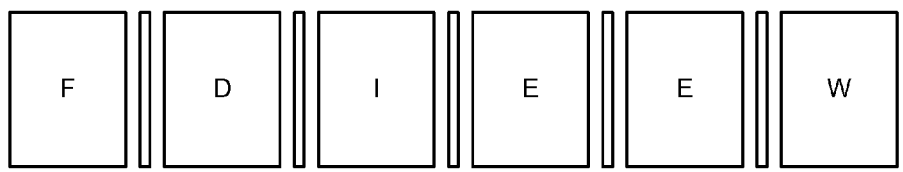
FIG. 3 is an illustration of a conventional pipeline.

The multithreading capability of the present invention permits multiple threads to exist in the pipeline concurrently. FIG. 2 is an illustration of an interrupt response in a multi-threaded environment. Threads A and B are both hard-real-time (HRT) threads which have stalled pending interrupts A and B respectively. Thread C is the main code thread and is non-real-time (NRT). When interrupt A occurs, thread A is resumed and will interleave with thread C. Thread C no longer has the full pipeline throughput since it is NRT. When interrupt B occurs thread B is resumed, and, being of the same priority as thread A, will interleave down the pipeline, thread C is now completely stalled. The main code—thread C will continue executing only when the HRT threads are no longer using all of the pipeline throughput.

Figure 5:
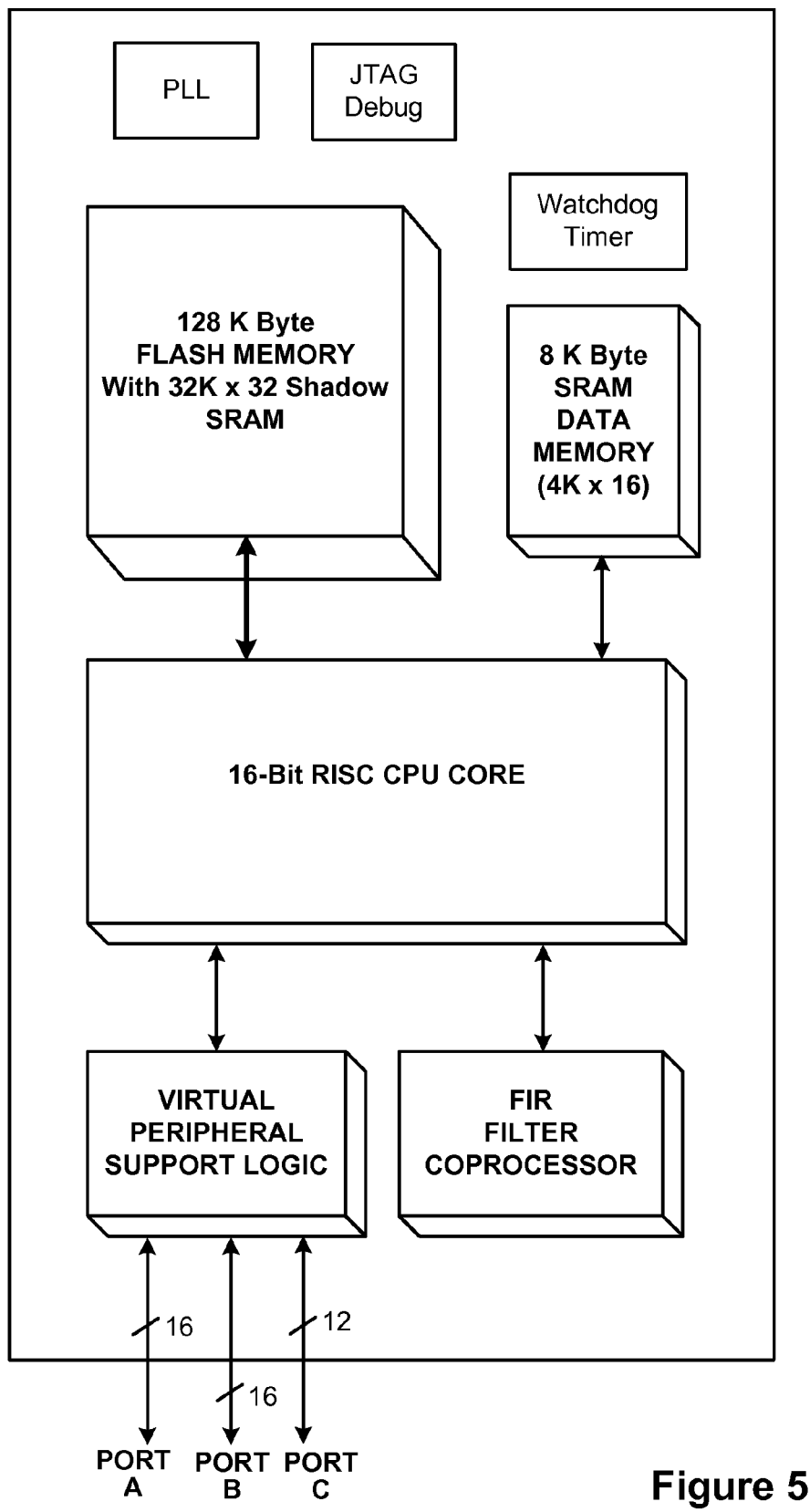
FIG. 5 is an illustration of an embedded processor according to one embodiment of the present invention.

FIG. 5 is an illustration of an embedded processor according to one embodiment of the present invention. The embedded processor can include peripheral blocks, such as a phase locked loop (PLL), or a watchdog timer. The embedded processor can also include a flash memory with a shadow SRAM. The shadow SRAM provides faster access to the program. In some semiconductor manufacturing processes SRAM access is faster than flash access. The loading of a program into the shadow SRAM is under program control. The embedded processor also includes a conventional SRAM data memory a CPU core, input/output (IO) support logic called virtual peripheral support logic, and a finite impulse response (FIR) filter coprocessor. The multithreading aspect of the present invention takes place largely in the CPU where the multiple thread contexts and thread selection logic reside. In addition, in some embodiments the multithreading might also exist in a coprocessor or DSP core which is on the same chip.

Figure 4:
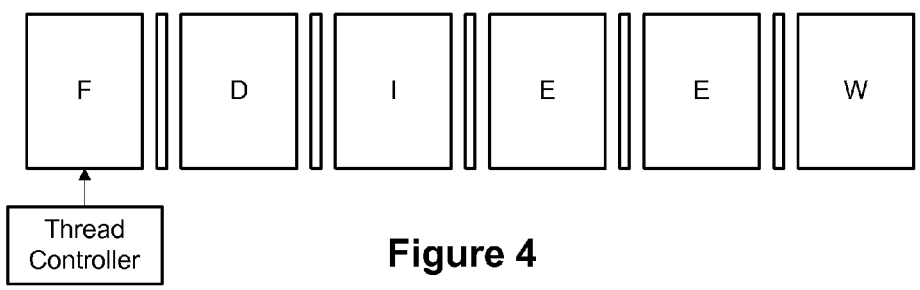
FIG. 4 is an illustration of a multithreaded fetch-switching pipeline according to one embodiment of the present invention.

As described above, a feature of the present invention is the ability to switch between thread contexts with no overhead. A zero overhead context switch can be achieved by controlling which program-counter the fetch unit uses for instruction fetching. FIG. 4 is an illustration of a multithreaded fetch-switching pipeline according to one embodiment of the present invention. The processor will function with information from different threads at different stages within the pipeline as long as all register accesses relate to the correct registers within the context of the correct thread.

By thread switching every cycle (or every quanta, i.e., a set number of cycles or instructions) the system will also reduce/ eliminate the penalty due to a jump (requiring a pipeline flush) depending on the number of equal-priority threads which are active. There is only a need to flush the jumping thread and so if other threads are already in the pipeline the flush is avoided/reduced.

Zero-time context switching is the ability to switch between one program context and another without incurring any time penalty. This implies that the context switch occurs between machine instructions. The same ideas can also be applied to low-overhead context switching, where the cost of switching between contexts is finite, but small. The present invention includes both of these situations although, for sake of clarity, the zero-time context switch is described below. The difference between the zero-time context switch and the low-overhead context switch will be apparent to persons of ordinary skill. As described above, a program context is the collection of registers that describe the state of the machine. A context would typically include the program counter, a status register, and a number of data registers. It is possible that there are also some other registers that are shared among all programs.

As an instruction is passed down the pipeline, a context number is also passed with it. This context number determines which context registers are used to load the program counter, load register values from or to save register values to. Thus, each pipeline stage is capable of operating in separate contexts. Switching between contexts is simply a matter of using a different context number.

Figure 6:
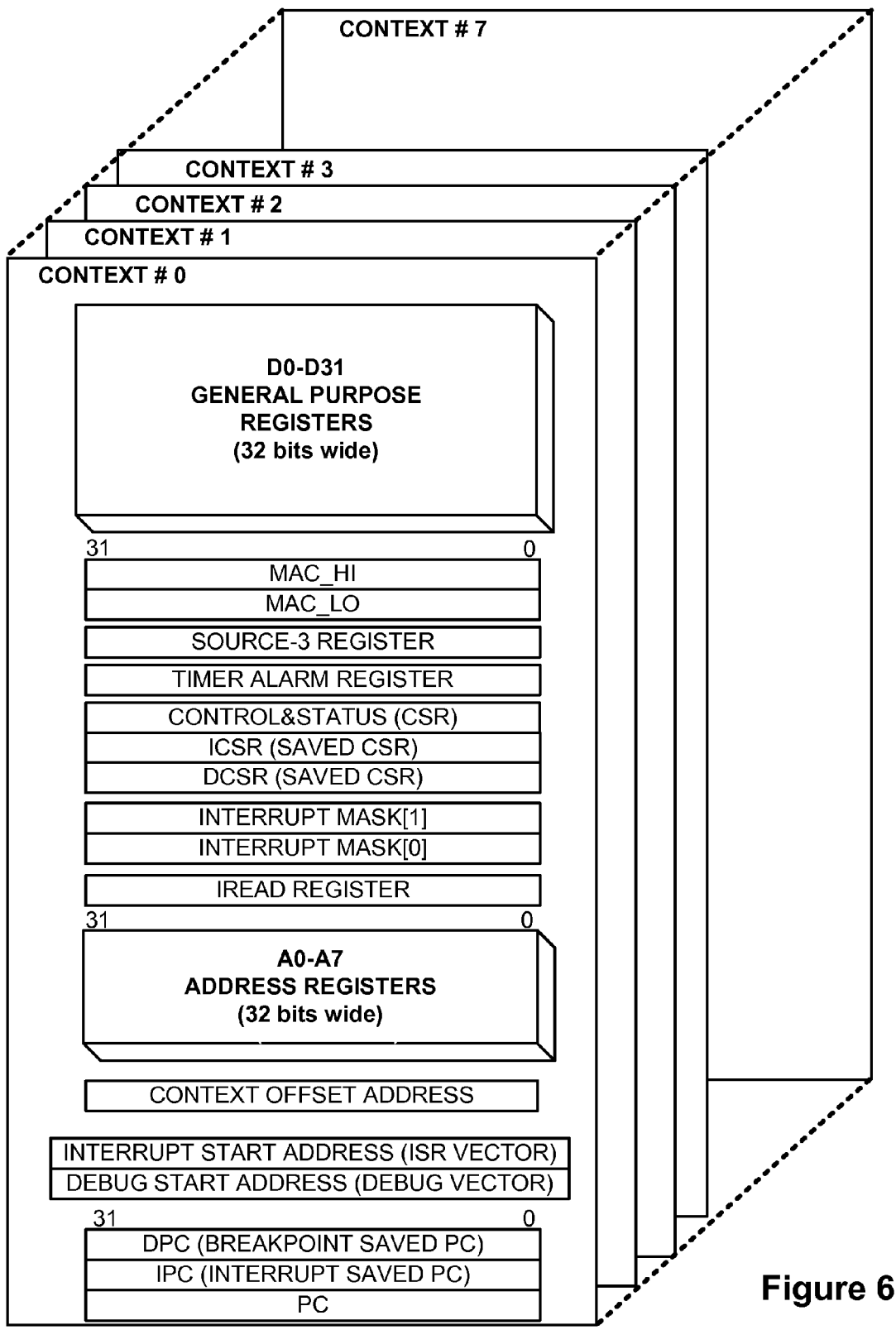
FIG. 6 is an illustration of an example of a per-thread context according to one embodiment of the present invention.

FIG. 6 is an illustration of an example of a per-thread context according to one embodiment of the present invention. The context in this example includes 32 general-purpose registers, 8 address registers and a variety of other information as illustrated. The type of data that is stored as part of a thread's context may differ from that illustrated in FIG. 6.

The present invention is an instruction level multithreading system and method that takes advantage of the zero-time context switch to rapidly (as frequently as every instruction) switch between two or more contexts. The amount of time that each context executes for is called a quantum. The smallest possible quantum is one clock cycle, which may correspond to one instruction. A quantum may also be less than one instruction for multi-cycle instructions (i.e., the time-slice resolution is determined solely by the quantum and not the instruction that a thread is executing). A detailed description of the allocation and scheduling is described below and is described in U.S. patent application Ser. No. 09/748,098 that is incorporated by reference herein in its entirety.

The allocation of the available processing time among the available contexts is performed by a scheduling algorithm. In a conventional simultaneous multithreading system, such as S. Eggers et al, "Simultaneous Multithreading: A Platform for Next Generation Processors" IEEE Micro, pp. 12-19, (September/October 1997) that is incorporated by reference herein in its entirety, the allocation of quanta among contexts (i.e., the time that context switches occur) is determined by external stimuli, such as the availability of instructions or data in the cache.

In the present invention, a benefit occurs when the allocation of quanta is done according to a fixed schedule. This scheduling of the contexts can be broken into three classes strict scheduling, semi-flexible scheduling and loose scheduling.

Figure 7A:
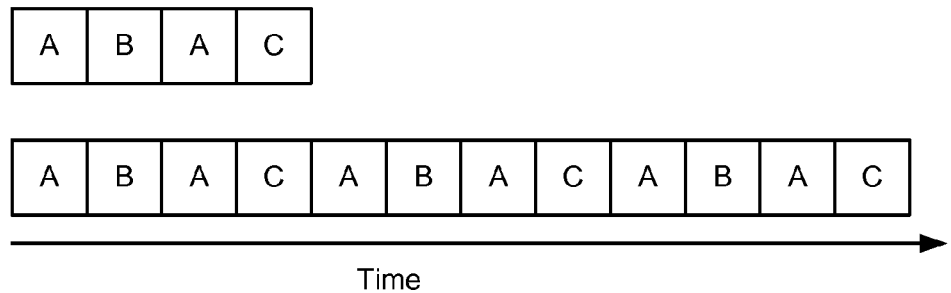
FIG. 7a is an illustration of a strict scheduling example according to one embodiment of the present invention.
Figure 7B:
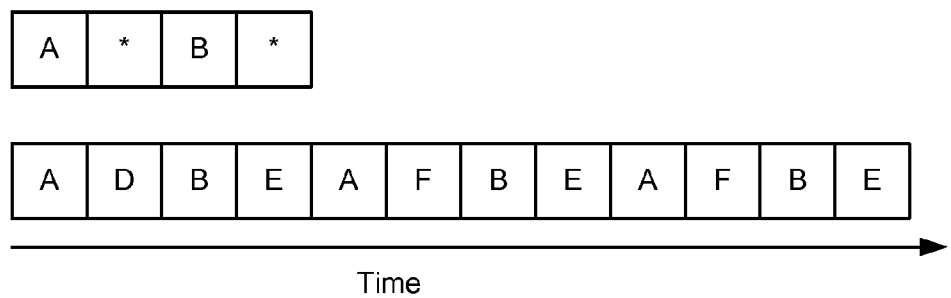
FIG. 7b is an illustration of a semi-flexible scheduling example according to one embodiment of the present invention.

FIG. 7a is an illustration of a strict scheduling example according to one embodiment of the present invention. FIG. 7b is an illustration of a semi-flexible scheduling example according to one embodiment of the present invention. FIG.

7c is an illustration of a loose scheduling example according to one embodiment of the present invention.

With reference to FIG. 7a, when the scheduler, e.g., the thread controller that is illustrated in FIG. 4, utilizes strict scheduling the schedule is fixed and does not change over short periods of time. For example if the schedule is programmed to be "ABAC" as illustrated in FIG. 7a then the runtime sequence of threads will "ABACABACABAC . . . " as illustrated in FIG. 7a. Threads that are strictly scheduled are called hard-real-time (HRT) threads because the number of instructions executed per second is exact and so an HRT thread is capable of deterministic performance that can satisfy hard timing requirements.

With reference to FIG. 7b, when the scheduler utilizes a semi-flexible scheduling technique some of the schedule is fixed and the rest of the available quanta are filled with non-real time (NRT) threads. For example, if the schedule is programmed to be "A*B*" where "*" is a wildcard and can run any NRT thread, the runtime sequence of threads, with threads D, E and F being NRT threads, could be "ADBEAF-BEAFBE . . . " as illustrated in FIG. 7b.

Some of the benefits of using either strict scheduling or semi-flexible scheduling are that the allocation of execution time for each HRT thread is set and therefore the time required to execute each thread is predictable. Such predictability is important for many threads since the thread may be required to complete execution within a specific time period. In contrast, the interrupt service routine described above with reference to conventional systems does not ensure that the hard real time threads will be completed in a predictable time period.

The static and semi-flexible schedule for hard real-time threads is achieved using a programmable quantum cycle table. Each entry in the table represents an available quanta cycle and provides the hard-real-time thread the cycle it is allocated to. The table is of variable length, e.g., up to 64 entries. When the end of the table is reached the scheduler continues from the first element in the table thus providing an infinitely repeating sequence. For example, FIG. 7d is an illustration of a semi-flexible thread schedule using three hard-read time threads according to one embodiment of the present invention. Thread A is scheduled 50% of the time, thread B is scheduled 25% of the time and thread C is scheduled 12.5% of the time. The remaining 12.5% is allocated to processing non-real time threads. If the CPU is clocked at 200 MIPS this would equate to thread A having a dedicated CPU execution rate of 100 MIPS, thread B having a dedicated CPU execution rate of 50 MIPS, thread C having a dedicated CPU execution rate of 25 MIPS and the remaining threads, e.g., non-real time threads, having a minimum CPU execution rate of 25 MIPS.

Accordingly, each hard-real time thread is guaranteed particular execution rate because they are allocated instruction slots as specified in the table, thus they each have guaranteed deterministic performance. The predictability afforded by the present invention significantly increases the efficiency of programs since the time required to execute hard-real time threads is known and the programs do not need to allocate extra time to ensure the completion of the thread. That is, the interrupt latency for each hard-real-time thread is deterministic within the resolution of its static allocation. The latency is determined by the pipeline length and the time until the thread is next scheduled. The added scheduling jitter can be considered to be the same as an asynchronous interrupt synchronizing with a synchronous clock. For example, a thread with 25% allocation will have a deterministic interrupt latency with respect to a clock running at 25% of the system clock.

Although the table reserves the instruction slots for the hard-real-time tasks this does not mean that other non-real time tasks cannot also execute in that instruction slot. For example, thread C may be idle most of the time. For example, if thread C represents a 115.2 kbps UART, then it only needs deterministic performance when it is sending or receiving data. There is no need for it to be scheduled when it is not active. All empty instruction slots, and those instruction slots that are allocated to a thread that is not active can be used by the scheduler for non-real-time threads.

More than 50 percent of the available MIPS can be allocated to a single thread. Although this will result in a non-deterministic inter-instruction delay, the time between successive instructions from the same thread would not be the same. For some applications this varying inter-instruction delay is not a disadvantage. For example, a thread could be scheduled in slots 1, 2, 3, 5, 6, 7, 9, . . . to achieve 75 percent of the available MIPS of the CPU. One type of NRT thread scheduling rotates through each thread. That is, the threads are scheduled in order, with one instruction executed from each active thread. This type of semi-flexible scheduling permits non-real-time threads to be scheduled in the empty slots in the schedule, e.g., the quanta labeled "*" in FIG. 7d, and in slots where the scheduled hard real-time thread is not active, e.g., in place of thread B if thread B is not active, as described above. This type of scheduling is sometimes referred to as "round robin" scheduling.

Multiple levels of priority are supported for non-real-time threads. A low priority thread will always give way to higher priority threads. The high level priority allows the implementation of a real-time operating system (RTOS) in software by allowing multi-instruction atomic operations on low-priority threads. If the RTOS kernel NRT thread has a higher priority than the other NRT threads under its control then there is a guarantee that no low priority NRT threads will be scheduled while the high priority thread is active. Therefore the RTOS kernel can perform operations without concern that it might be interrupted by another NRT thread.

Figure 7C:
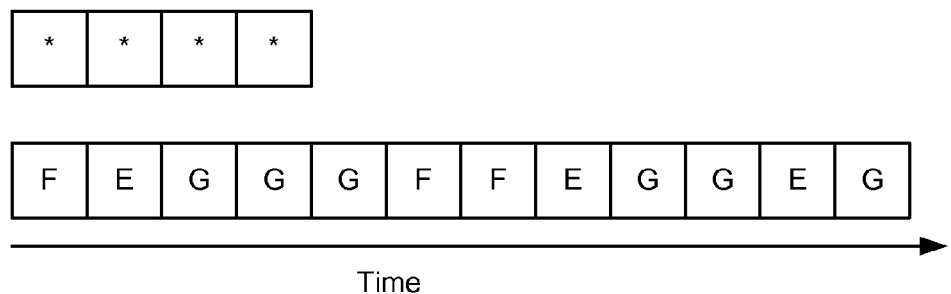
FIG. 7c is an illustration of a loose scheduling example according to one embodiment of the present invention.
Figure 7D:
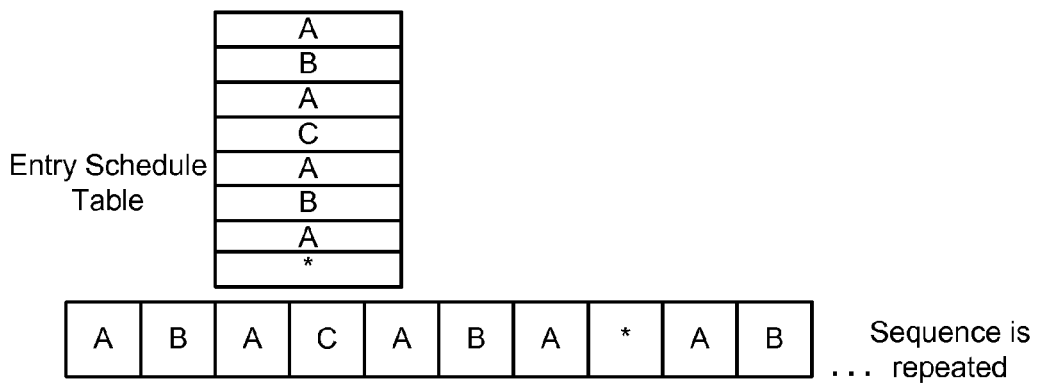
FIG. 7d is an illustration of a semi-flexible thread schedule using three hard-real time threads according to one embodiment of the present invention.

With reference to FIG. 7c, when the scheduler utilizes a loose scheduling technique none of the quantum are specifically reserved for real time threads and instead any quantum can be used for non-real time (NRT) threads.

A thread can have a static schedule (i.e., it is allocated fixed slots in the HRT table) and also be flagged as an NRT thread. Therefore, the thread will be guaranteed a minimum execution rate as allocated by the HRT table but may execute faster by using other slots as an NRT thread.

The present invention includes hardware support for running multiple software threads and automatically switching between threads as described below. This multi-threading support includes a variety of features including real-time and non-real-time task scheduling, inter-task communication with binary and counting semaphores (interrupts), fast interrupt response and context switching, and incremental linking.

By including the multi-threading support in the embedded processor core the overhead for a context switch can be reduced to zero. A zero-time context-switch allows context switching between individual instructions. Zero-time context switching can be thought of as time-division multiplexing of the core.

Figure 8:
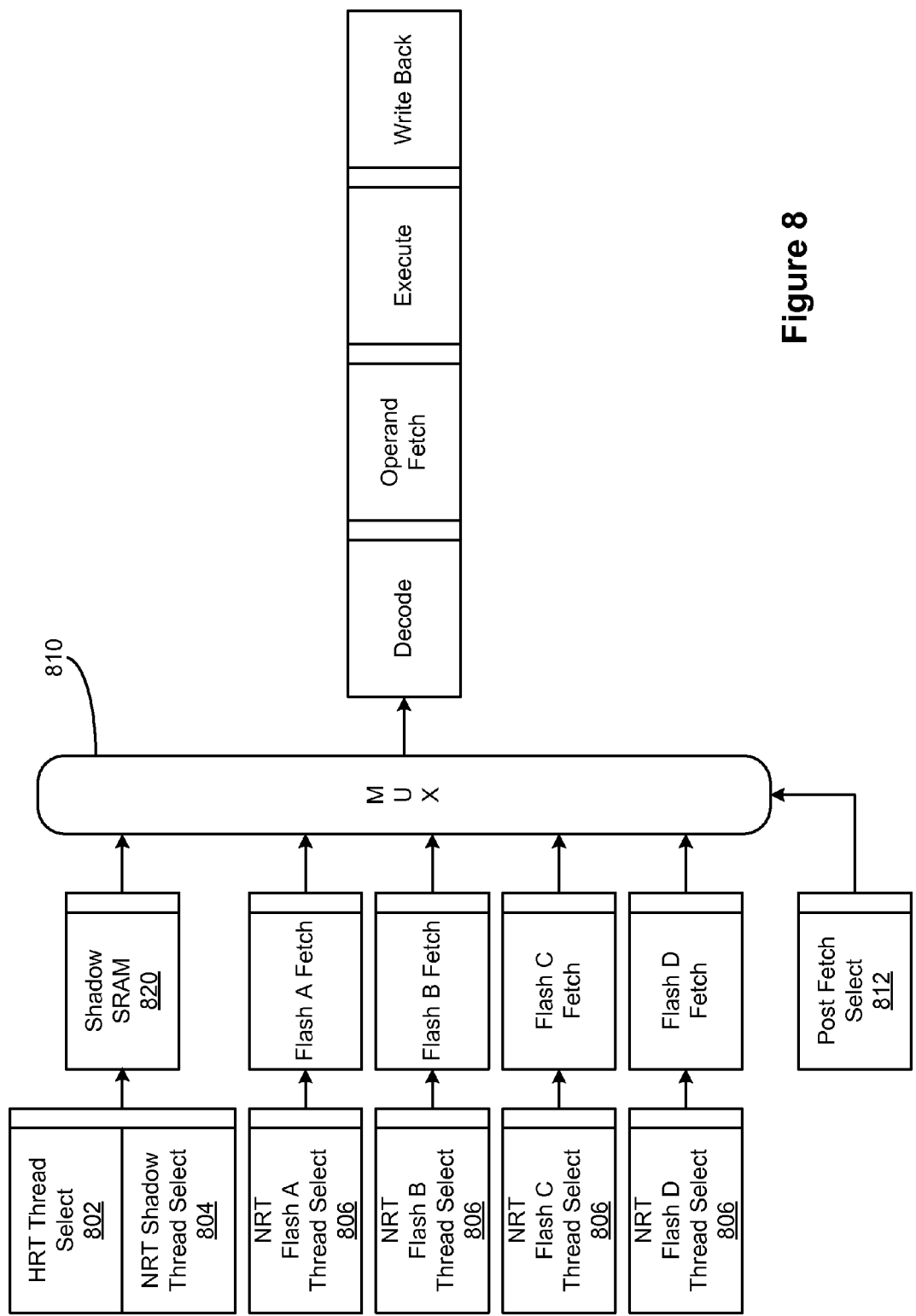
FIG. 8 is an illustration of thread fetching logic with two levels of scheduling according to one embodiment of the present invention.

In one embodiment of the present invention fetch logic can fetch code from both SRAM and flash memory, even when the flash memory is divided into multiple independent blocks. This complicates the thread scheduling of the present invention. In the present invention, each memory block is scheduled independently of the overall scheduling of threads. FIG. 8 is an illustration of thread fetching logic with two levels of scheduling according to one embodiment of the present invention.

In one embodiment of the present invention the instructions that are fetched can be stored in multiple types of memory. For example, the instructions can be stored in SRAM and flash memory. As described above, accessing data, e.g., instructions, from SRAM is significantly faster than accessing the same data or instructions from flash memory. In this embodiment, it is preferable to have hard-real-time threads be fetched in a single cycle so all instructions for hard-real-time threads are stored in the SRAM. In contrast, instructions fetched from non-real-time threads can be stored in either SRAM or flash memory.

With reference to FIG. 8, instructions in shadow SRAM are fetched based upon a pointer from either an HRT thread selector 802 or an NRT shadow thread selector 804. Instructions from the flash memory are fetched based upon a pointer from an NRT flash thread selector 806. The thread selectors 802, 804, 806 are described in greater detail below. The output of the SRAM and the flash memory are input into a multiplexor (MUX) 810 that outputs the appropriate instruction based upon an output from a post fetch selector 812, described below. The output of the MUX is then decoded and can continue execution using a traditional pipelined process or by using a modified pipelined process as described below, for example.

Figure 9:
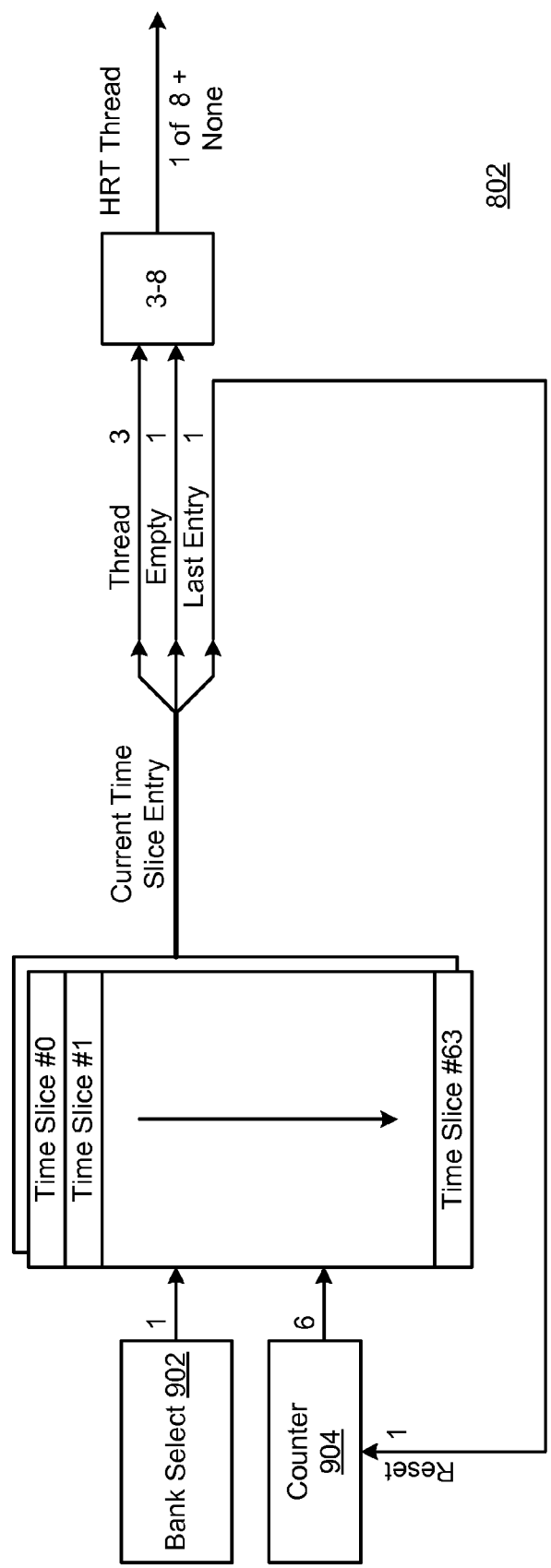
FIG. 9 is an illustration of the HRT thread selector according to one embodiment of the present invention.

FIG. 9 is an illustration of the HRT thread selector 802 according to one embodiment of the present invention. As indicated above, the shadow SRAM 820 provides a single cycle random access instruction fetch. Since hard-real-time (HRT) threads require single cycle determinism in this embodiment such HRT threads may execute only from SRAM. The HRT thread controller 802 includes a bank selector 902 that allows the choice of multiple HRT schedule tables. The bank selector determines which table is in use at any particular time.

The use of multiple tables permits the construction of a new schedule without affecting HRT threads that are already executing. A counter 904 is used to point to the time slices in the registers in the HRT selector 802. The counter will be reset to zero when either the last entry is reached or after time slice 63 is read. The counter 904 is used in conjunction with the bank selector 902 to identify the thread that will be fetched by the shadow SRAM in the following cycle. If the identified thread is active, e.g., not suspended then the program counter (PC) of the identified thread is obtained and is used as the address for the shadow SRAM in the following cycle. For example, with respect to FIG. 9, if based upon the bank selector 902 and the counter 904 time slice number 1 is identified, the thread identified by this time slice represents the thread that will be fetched by the SRAM in the following cycle.

The output of the block described in FIG. 9 is a set of signals. Eight signals are used to determine which of the eight threads is to be fetched. Of course this invention is not limited to controlling only eight threads. More signals could be used to control more threads. One signal is used to indicate that no HRT thread is to be fetched.

Figure 10:
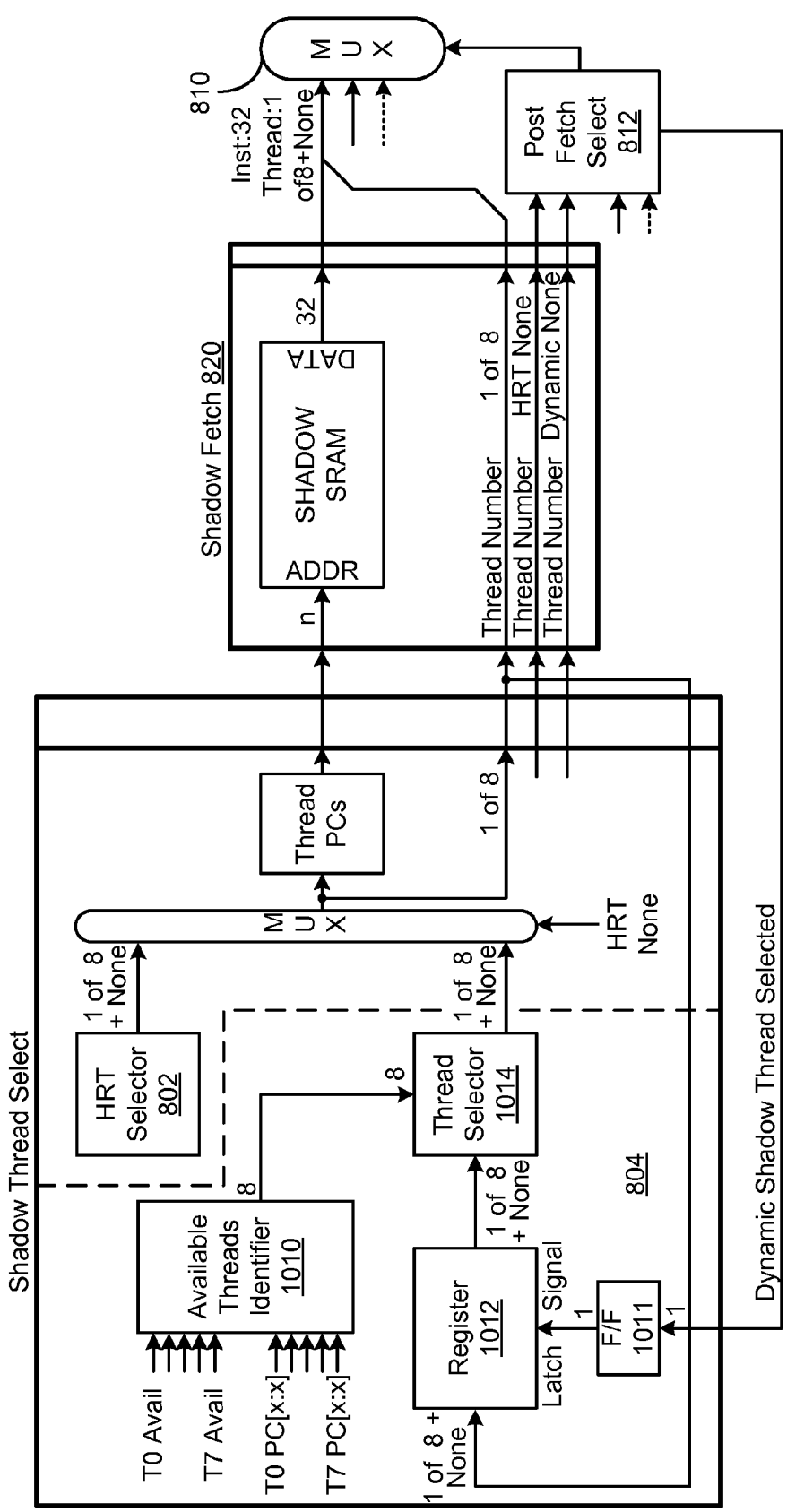
FIG. 10 is an illustration of the NRT shadow SRAM thread selector and SRAM accessing logic according to one embodiment of the present invention.

FIG. 10 is an illustration of the NRT shadow SRAM thread selector 804 and shadow SRAM accessing logic according to one embodiment of the present invention. The NRT shadow thread selector 804 includes an available thread identifier 1010 a register 1012 for identifying the previous dynamic thread that has been fetched from the shadow SRAM and a flip-flop (F/F) 1011. The register and available thread identifier 1010 (described below) are received by a thread selector unit that selects the thread to be accessed by the SRAM in the next cycle, if any. The thread selector 1014 uses the last thread number from 1012 and the available thread identifier from 1010 to determine which thread to fetch next to ensure a fair round-robin selection of the NRT threads.

Figure 11:
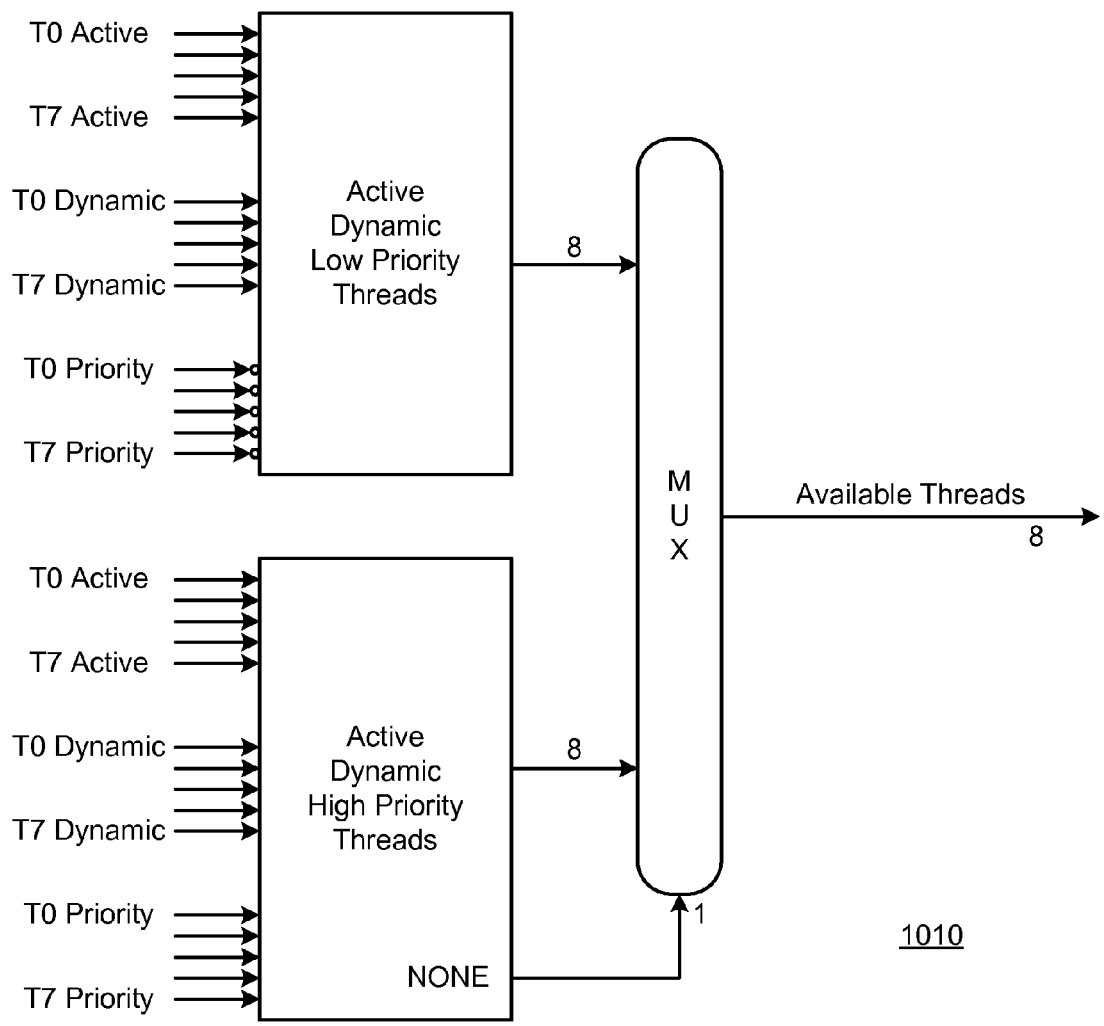
FIG. 11 is an illustration of the NRT thread availability selector according to one embodiment of the present invention.

FIG. 11 is an illustration of the NRT available thread identifier 1010 according to one embodiment of the present invention. The NRT available thread identifier 1010 generates an output for each thread based upon whether the thread is active, whether the thread is identified as being dynamic (NRT), and whether the thread is marked as being of a high priority. If there are no active, dynamic, high priority threads then the NRT available thread identifier 1010 generates an output for each thread based upon whether the thread is active, whether the thread is identified as being dynamic (NRT), and whether the thread is marked as being of a low priority.

The NRT shadow SRAM thread selector 804 generates for each thread a shadow-NRT-schedulable logic output based upon logic that determines whether the NRT schedulable output is true and whether the thread PC points to shadow SRAM. The determination of whether the PC specifies a location in shadow SRAM is done by inspecting the address—the shadow SRAM and flash are mapped into different areas of the address space.

As described above the NRT available thread identifier 1010 identifies the available threads and one of these threads is selected based upon a previous thread that was selected and successfully fetched out of shadow RAM and used by the pipeline that is stored in register 1012.

If the HRT thread selector 802 indicates that the cycle is available for an NRT thread, then the PC of the selected thread is obtained to be used as the address for the shadow SRAM access in the following cycle.

The selected thread number (including if it is 'no-thread') is latched to be the register 1012 unless the current shadow SRAM access is an NRT thread (chosen in the previous cycle) AND the post-fetch selector 812 did not select the shadow SRAM to be the source for the decode stage. That is, the selected thread number is latched to be the "previous thread" register 1012 only if the current shadow SRAM access is a HRT thread OR if the current shadow SRAM access is no-thread OR if the current SRAM access is an NRT thread that has been chosen by the post-fetch selector 812. The post-fetch selector 812 is described in greater detail below.

Figure 12:
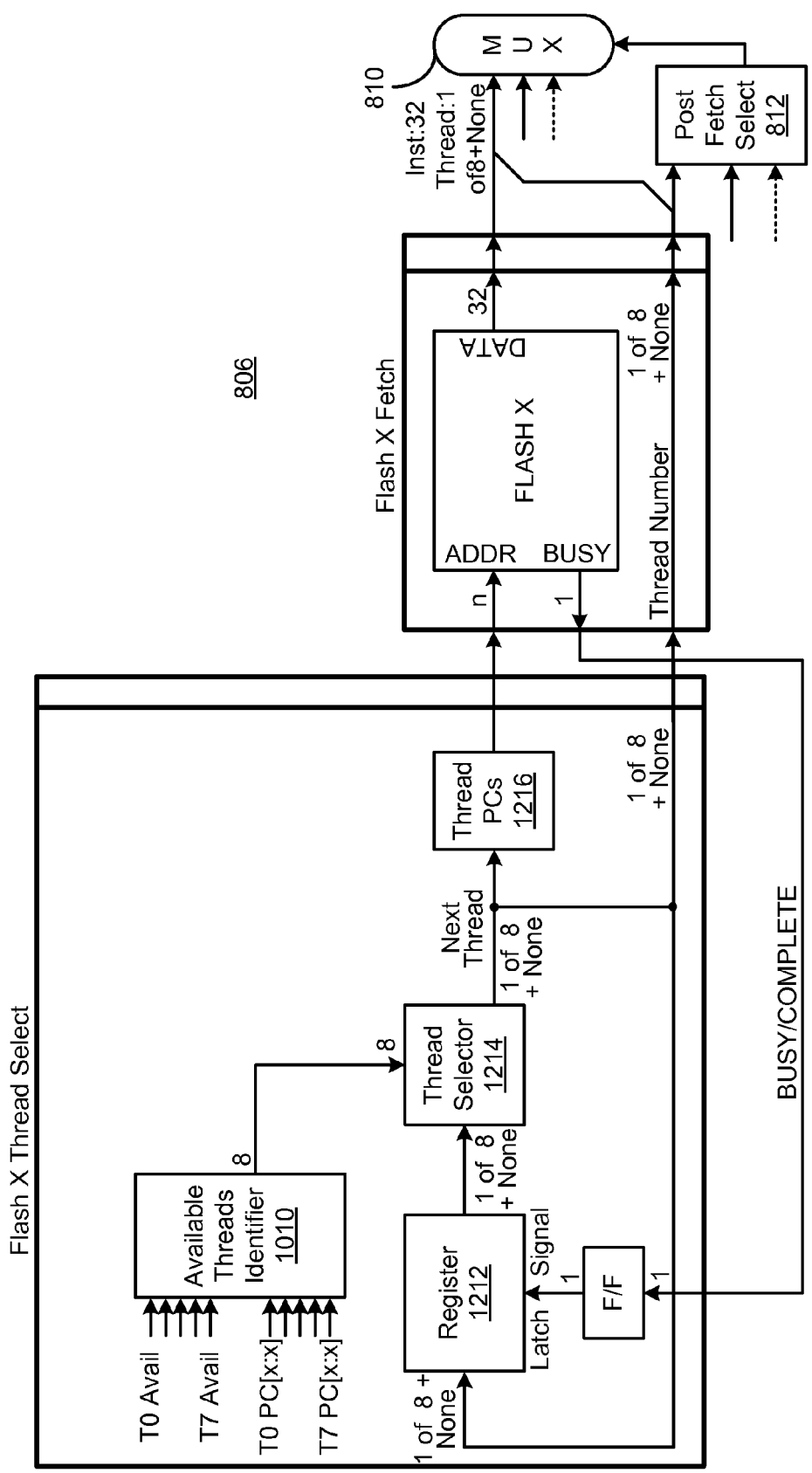
FIG. 12 is an illustration of the NRT flash memory thread selector according to one embodiment of the present invention.

FIG. 12 is an illustration of the NRT flash memory thread selector 806 according to one embodiment of the present invention. The flash read only memory (ROM) requires multiple clock cycles to access its data. In this embodiment of the present invention, in order to increase the instruction rate from the flash ROM the flash is divided into four blocks corresponding to four ranges in the address space. These blocks are identified as flash A, flash B, flash C, and flash D in FIG. 8. Each block can fetch independently and so each requires its own NRT thread selector 806 to determine which threads can be fetched from each particular block. As indicated above, only NRT threads can be executed from the flash ROM.

The intersection of the set of active threads and the set of threads where the PC is in this flash block is generated by the available thread identifier 1010 and is received by a thread selector 1214. The thread selector 1214 uses the previous thread number to select the next thread in a round-robin manner. The thread PCs unit 1214 determines the program counter (PC) for the selected thread and passes this PC to the flash block as the address. The output of the flash is double buffered, meaning that the output will stay valid even after a subsequent fetch operation begins.

Figure 13:
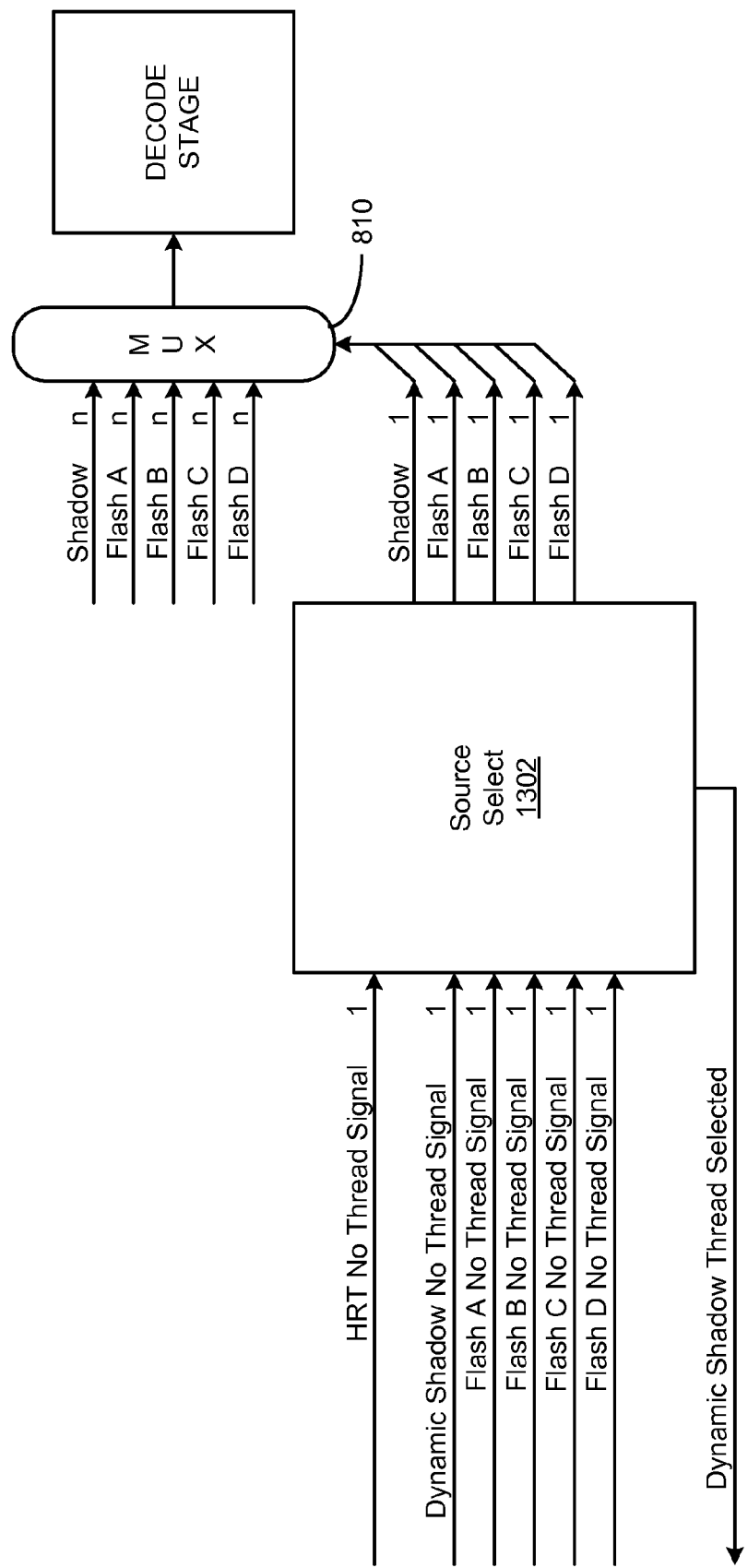
FIG. 13 is an illustration of the post fetch selector according to one embodiment of the present invention.

FIG. 13 is an illustration of the post fetch selector according to one embodiment of the present invention. After each of the flash blocks and SRAM block has selected a thread, the post fetch selector 812 chooses the thread that is passed to the pipeline. If a HRT thread is active this is always chosen. Otherwise an NRT thread will be chosen. In this example the flash/shadow SRAM resource is chosen in a round-robin order, depending on the last flash (or shadow SRAM) block that an NRT thread was selected from by the source selector 1302.

Another aspect of the present invention is the ability to save and restore thread states for either the related thread or another thread. Multithreaded CPUs have several threads of execution interleaved on a set of functional units. The CPU state is replicated for each thread. Often one thread needs to be able to read or write the state of another thread. For example, a real-time operating system (RTOS) running in one thread might want to multiplex several software threads onto a single hardware thread, so it needs to be able to save and restore the states of such software threads.

Other processors have a separate operating system (OS) kernel running on each hardware thread that is responsible for saving and restoring the state of that thread. This may not be adequate if code from an existing RTOS is to be used to control hardware threads.

One type of instruction set that can be used with the present invention is a memory-to-memory instruction set, with one general source (memory or register), one register source, and one general destination. The invention allows one thread to set its general source, general destination, or both, to use the thread state of another thread. Two fields in the processor status word, source thread, and destination thread, are used, and override the normal thread ID for the source and/or destination accesses to registers or memory.

This invention allows RTOS code from traditional single-threaded CPUs to be easily ported to the new multithreaded architecture. It gives a simple way state between a worker thread and a supervisory thread.

Figure 14:
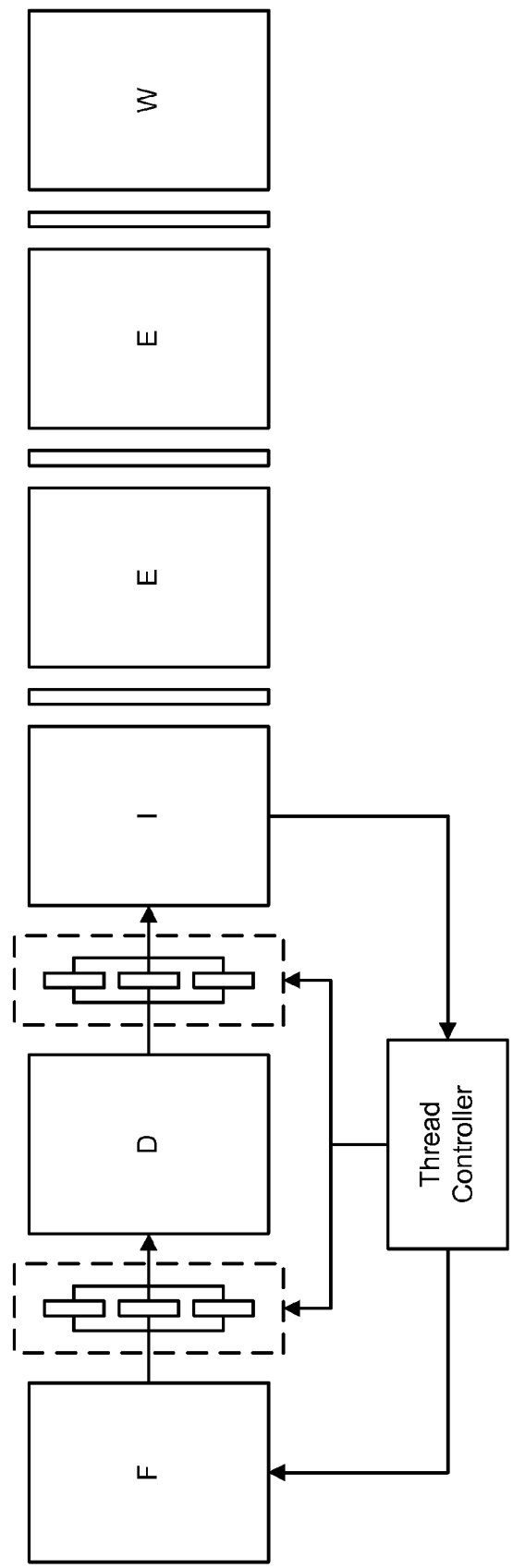
FIG. 14 is an illustration of a multithreaded issue-switching pipeline according to one embodiment of the present invention.

In another embodiment of the present invention, the above-described multithreading system can be used with more powerful pipeline structures. FIG. 14 is an illustration of a multi-threaded issue-switching pipeline according to one embodiment of the present invention. In conventional pipeline processing environments the fetch and decode stages result in the same output regardless of when the fetch and decode operations occur. In contrast the issue stage is data dependant, it obtains the data from the source registers, and therefore the result of this operation depends upon the data in the source registers at the time of the issue operation. In this embodiment of the present invention the thread-select decision is delayed to the input of the issue stage.

In one embodiment of the present invention, issue switching is implemented by using thread latches in the fetch and issue stages as shown in FIG. 14. The issue stage decides which thread to execute based not only on priority, and the thread-switching algorithm (as with the pre-fetch selection), but also on data and resource dependencies. Any number of threads could be managed in hardware by increasing the number of latches within the fetch and issue stages.

Figure 15:
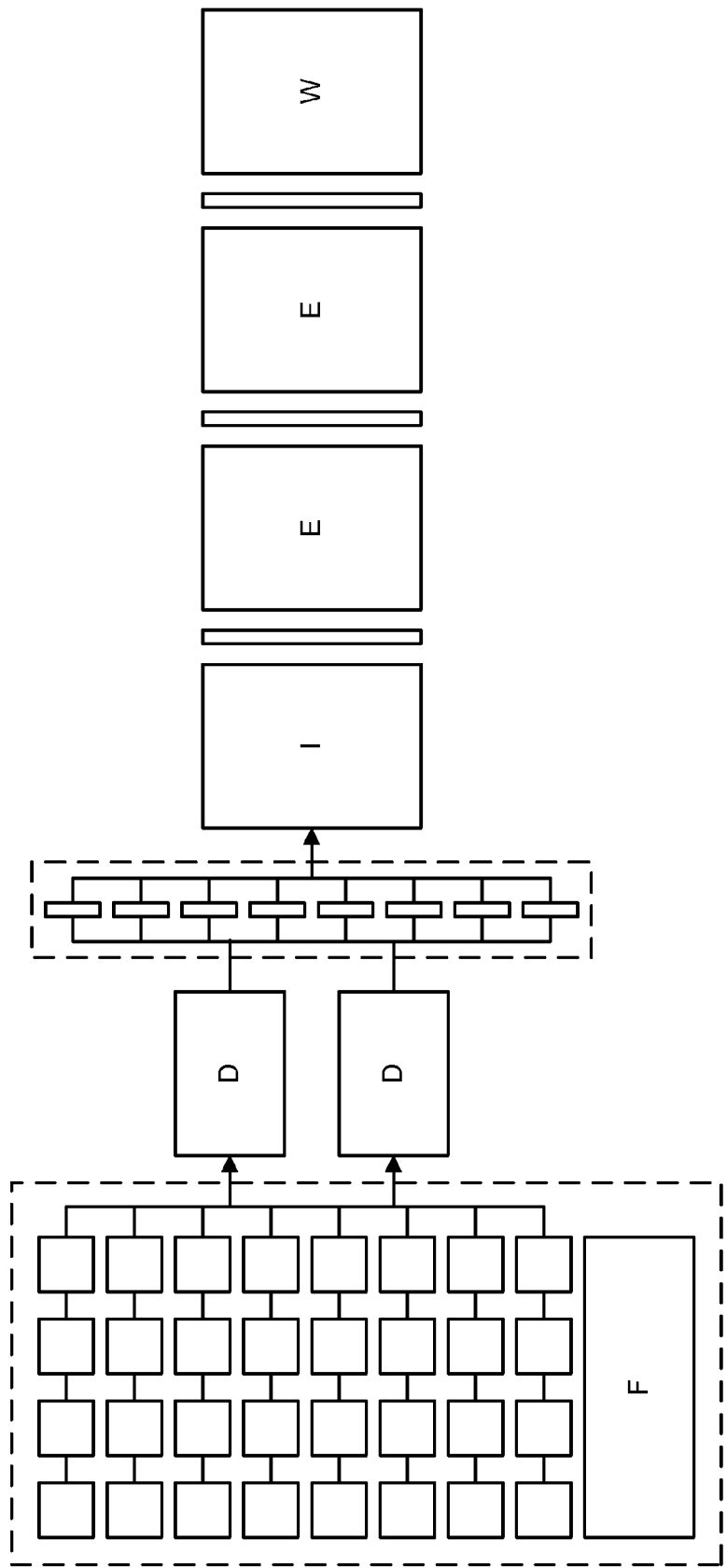
FIG. 15 is an illustration of a multithreaded, pipelined fetch parallel decode pipeline according to one embodiment of the present invention.

FIG. 15 is an illustration of a multithreaded parallel decode pipeline according to one embodiment of the present invention. FIG. 15 shows the parallel fetch and decode enhancement. The parallel fetch stages need memory access during each every cycle and therefore cannot be paralleled without a pre-fetch system or by multi-porting the program memory. Multi-porting of program memory would not be an economical solution as every thread would require its own port with poor utilization. A pre-fetch system could be used to reduce bus contentions by fetching lines of program-memory at a time. If a buffer line was implemented for every thread and these buffer lines were multi-ported between the fetch and decode stages then the fetch unit could supply instructions from any threads in parallel. As a result, the thread-switch can better hide a pipeline flush and decrease the interrupt latency. For example, the jump flush improvement comes in the situation when there are insufficient equal priority threads to launch and a lower priority thread could be launched instead. The interrupt latency improvement would be due to the start of the ISR code being already fetched and decoded ready for issuing on interrupt.

Figure 16:
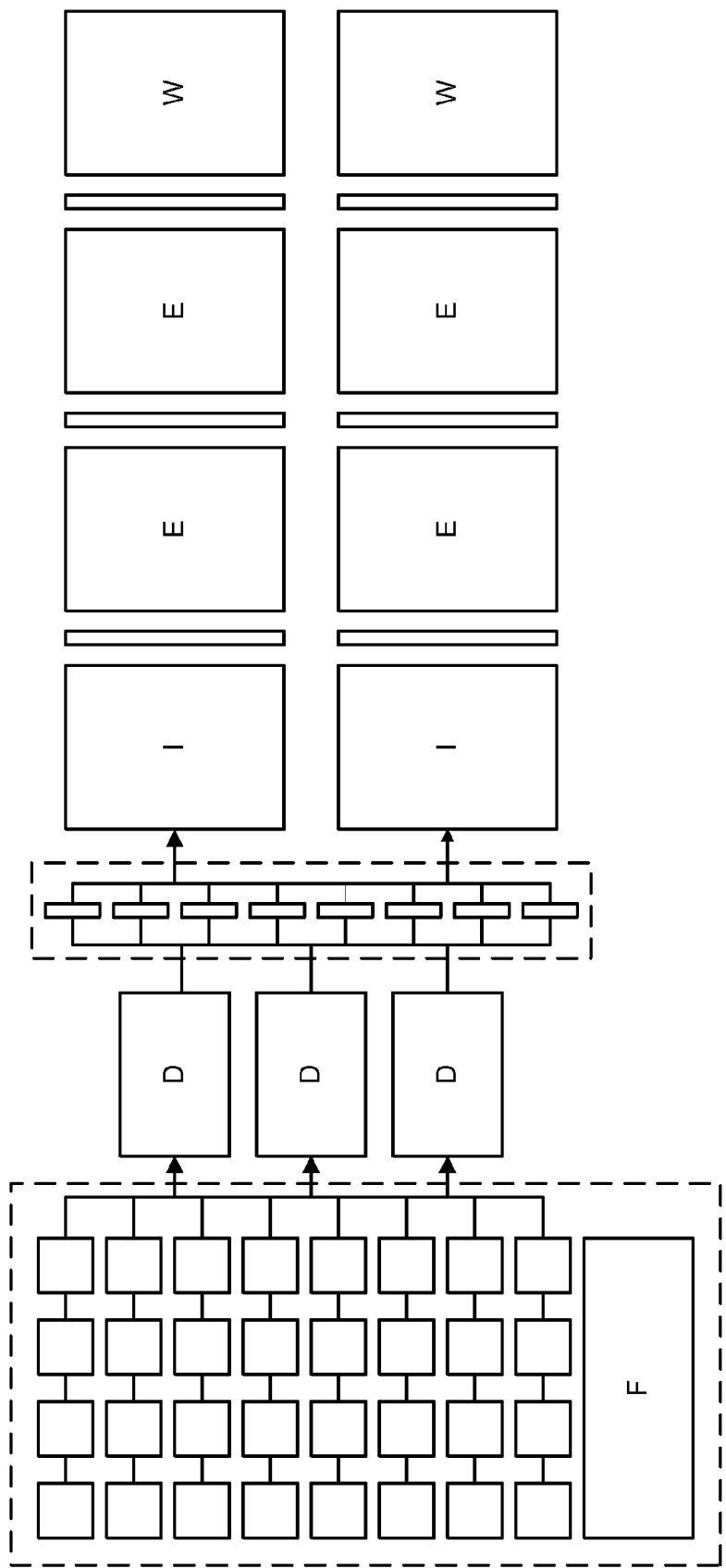
FIG. 16 is an illustration of a multithreaded superscalar pipeline according to one embodiment of the present invention.

FIG. 16 is an illustration of a multithreaded superscalar pipeline according to one embodiment of the present invention. In FIG. 16 multiple instructions are executed in parallel from the same thread or from different threads in order to maximize the utilization of the execute functional units. The issue stage is responsible for the thread selection, resource allocation, and data dependency protection. Therefore, the issue stage is capable of optimizing the scheduling of threads to ensure maximum resource utilization and thus maximum total throughput. The earlier stages (Fetch and Decode) attempt to maintain the pool of threads available to the issue thread selector.

One feature of the multithreading embedded processor of the present invention is the ability to integrate virtual peripherals (VPs) that have been written independently and are distributed in object form. Even if the VPs have very strict jitter tolerances they can be combined without consideration of the effects on the different VPs on each other.

For example consider the VPs and tolerable jitter below: (1) UART 115.2 kbps, 217 nanoseconds (ns), (2) 10BaseT Ethernet, 10 ns, (3) TCP/IP stack, 10 milliseconds (ms), and (4) application code, 50 ms. If a designer is integrating these VPs to make a system he or she merely needs to determine the static schedule table.

Since the TCP/IP and application code is timing insensitive both VPs are scheduled as NRT threads. The other two VPs need deterministic response to external events and so must be scheduled as hard real-time threads. If the target CPU speed is 200 MHz then the Ethernet VP requires 50% of the MIPS, i.e., a response of 5 ns, and it cannot have more than one instruction delay between its instructions. The UART VP requires less than 1% of the MIPS but does require to be serviced within its jitter tolerance so is scheduled four times in the table.

The result is that four VPs, possibly each from different vendors, can each be integrated without modifying any code and requiring only some simple mathematics to determine the percentage of total computing power each thread needs. The VPs will work together without any timing problems since each thread that needs it is guaranteed its jitter performance.

Of course the VPs will only work together if they can communicate with each other. This requires the definition of suitable high-level APIs the details of which would be apparent to a person of ordinary skill in the art. Table 1 is an example of a receive UART thread.

TABLE 1

```
UartRxReset
:Start  setb    UartRxPinIntE              ;Enable hardware interrupt
        clrb    UartRxPinIntF              ;Clear hardware interrupt
                                            flag
        suspend                             ;Wait for start edge mt
        mov     RTCC, #Uart115200 * 1.5    ;Initialise RTCC
        clrb    RTCCIntF                    ;Clear timer interrupt flag
        setb    RTCCIntE                    ;Enable timer interrupt
        mov     UartRxBits,                 ;Reset data bits
                #%01111111111111111
        clrb    UartRxPinIntE              ;Disable hardware interrupt
:Loop   clc                                 ;Guess input will be a 0
        suspend                             ;Wait for timer interrupt
        snb     UartRxPin                   ;Is the input 1 ?
        stc                                 ;yes => change to a 1
        rr      UartRxBits, 1              ;Add bit to data bits
        snb     UartRxBits.7                ;Complete "
        jmp     :Loop                       ;No => get next bit
        clc                                 ;Will shift in 0
        rr      UartRxBits, 8              ;Shift data bits right 8 times
        mov     UartRxData, UartRxBits     ;Save data
        int     UartRxAvailInt             ;Signal RxAvail interrupt
        clrb    RTCCIntE                    ;Disable timer interrupt
        jmp     :Start                      ;Wait for next byte
```

The thread suspends itself pending the falling edge of the start bit. When this interrupt occurs the thread is resumed and the timing for the incoming data is based on the exact time that the start edge was detected. This technique allows higher accuracy and therefore enables improves the operation of embedded processors.

The thread will suspend itself pending the next timer interrupt for every bit that is received (The RTCC timer is independent for each thread and so will not conflict with other VPs).

On the completion of the byte the code issues a software interrupt to signal to the application layer that a byte is available to be read. The "INT" instruction simply sets the interrupt flag. The application layer will either be polling this interrupt flag or will be suspended and so resumed by this interrupt.

An example of a transmit UART thread is set forth in Table 2.

TABLE 2

```
UartTxReset
        setb    UartTxPin              ;Idle high
:Start  clrb    RTCCIntE                ;Disable timer interrupt
        setb    UartTxStartIntE         ;Enable TxStartInt
        suspend                         ;Wait for TxStart int
        clrb    UartTxpin               ;Output start bit
        mov     RTCC, #Uart115200       ;Initialise RTCC
        clrb    RTCCIntF                ;Clear timer interrupt flag
        setb    RTCCIntE                ;Enable timer interrupt
        mov     UartTxBits, UartTxData ;Save data to transmit
        setb    UartTxBits.8            ;Add stop bit to data
        clrb    UartTxStartIntE         ;Disable TxStart interrupt
        clrb    UartTxStartIntF         ;Clear TxStart interrupt flag
        int     UartTxEmpty             ;Indicate ready for next byte
:Loop   clc                             ;Will shift in 0
        rr      UartTxBits, 1          ;Shift data by 1
        snc                             ;Carry a 0?
        jmp     :1                      ;No => prepare to output 1
:0      suspend                         ;Yes => wait for timer int
        clrb    UartTxpin               ;Output 0
        mov     RTCC, #Uart115200       ;Initialise RTCC
        test    UartTxBits              ;Check bits
        sz                              ;More bits to send ?
        jmp     :Loop                   ;Yes => prepare next bit
        jmp     :Start                  ;No =>wait for next byte
:1      suspend                         ;Wait for timer int
        setb    UartTxPin               ;Output 1
        mov     RTCC, #Uart115200       ;Initialise RTCC
```

TABLE 2-continued

```
        test    UartTxBits              ;Check bits
        sz                              ;More bits to send ?
        jmp     :Loop                   ;Yes => prepare next bit
        jmp     :Start                  ;No => wait for next byte
```

The thread suspends itself pending the user-defined TxStart software interrupt. When this interrupt is triggered by the application thread the Tx UART thread is resumed and the byte to be transmitted is transferred into an internal register (UartTxBits). At this point in time the application is free to send a second byte and so the interrupt flag is cleared and the UartTxEmpty interrupt is triggered.

The byte is transmitted by suspending after each bit-pending the next RTCC interrupt (The RTCC timer is independent for each thread and so will not conflict with other VPs).

When the transmission is complete the thread will suspend pending the TxStart interrupt again. It is possible that the TxStart interrupt was triggered during the transmission of the last byte and so the thread may be resumed immediately.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-based system for switching between program contexts comprising:
   a processor capable of having a first program thread and a second program thread in an execution pipeline having thread selection hardware;
   a first set of data storage devices capable of storing a first thread state of said processor;
   a second set of data storage devices capable of storing a second thread state of said processor; and
   a hardware thread scheduler for identifying which of said first and second program threads said processor executes and configurable to allocate available processing time of the processor among at least the first and second program threads by causing thread-switching from execution of the first program thread directly to execution of the second program thread at a fixed time according to a predetermined fixed schedule and without using interrupts by accessing one or more registers included in the first set or the second set of data storage devices based on a context number associated with an instruction included in a program thread identified for execution by the predetermined fixed schedule, said schedule specifying that the first thread should be allocated processing time every first number of cycles and that the second thread should be allocated processing time every second number of cycles, wherein said first number of cycles is not equal to said second number of cycles.

2. The system of claim 1, wherein said thread selection hardware in the pipelined processor switches between said first and second thread state after the end of the execution of a first program instruction in the first thread and before the beginning of the execution of a second program instruction.

3. The system of claim 1, wherein said processor is an embedded pipelined processor.

4. The system of claim 1, wherein said first thread state is the thread state of the processor during the execution of the first program thread.

5. The system of claim 1, wherein said second thread state is the thread state of the processor during the execution of the second program thread.

6. The system of claim 1, wherein said processor switches between said first and second thread state by changing a state selection register.

7. The system of claim 1, wherein said hardware thread scheduler includes:
a thread identifier for identifying at least one hard-real-time (HRT) thread and at least one non-real-time (NRT) thread;
an HRT scheduler for regularly scheduling an HRT thread according to the predetermined fixed schedule in available time quanta such that said HRT thread is scheduled to ensure the execution of the HRT thread within a predetermined time.

8. The system of claim 7, wherein said time quanta is at least-one instruction cycle.

9. The system of claim 7, wherein said hardware thread scheduler schedules an NRT thread to replace a scheduled HRT thread if said scheduled HRT thread is idle.

10. The system of claim 7, wherein said hardware thread scheduler schedules the execution of NRT threads in quanta not allocated to HRT threads.

11. The system of claim 10, wherein said hardware thread scheduler regularly schedules NRT threads to be executed.

12. The system of claim 7, further comprising:
a first storage device for storing program instructions, said processor fetching instructions from the first storage device within a first fetch period;
a second storage device for storing program instructions, said processor fetching instructions from the second storage device within a second fetch period;
wherein said first fetch period is substantially shorter than said second fetch period.

13. The system of claim 12, wherein said first storage device for storing program instructions comprises a static random access memory (RAM).

14. The system of claim 12, wherein said second storage device for storing program instructions comprises a flash memory.

15. The system of claim 1, wherein said processor is capable of restoring said second thread state of said processor during execution of said first program thread.

16. The system of claim 1, wherein said processor is capable of storing said second thread state of said processor during execution of said first program thread.

17. The system of claim 1, wherein said first set of data storage devices comprises registers shared by a plurality of threads.

18. A computer-based system for switching between program contexts comprising:
a pipelined processor capable of having a first program thread and a second program thread in an execution pipeline coupled to thread selection hardware, the execution pipeline including a set of stages for executing instructions and configured to execute a single instruction at each different stage of the set of stages;
a first set of data storage devices capable of storing a first thread state of said pipelined processor;
a second set of data storage devices capable of storing a second thread state of said pipelined processor; and
a hardware thread scheduler for identifying which of said first and second program threads said pipelined processor executes and configurable to allocate available processing time of the pipelined processor among at least the first and second program threads according to a predetermined fixed execution schedule controlling whether the execution pipeline retrieves an instruction from the first set of data storage devices or the second set of data storage devices, said schedule specifying that the first program thread should be allocated processing time every first number of cycles and that the second program thread should be allocated processing time every second number of cycles, wherein said first number of cycles is not equal to said second number of cycles;
wherein said thread selection hardware in the pipelined processor switches from said first thread state directly to said second thread state between consecutive instruction cycles without incurring a time penalty and without using interrupts, by connecting one or more registers included in the second set of data storage devices identified from a context number associated with an instruction included in the second thread state to the execution pipeline, in response to the hardware thread scheduler identifying the second thread state for execution by said pipelined processor.

19. The system of claim 18, wherein said first thread state is the thread state of the processor during the execution of the first program thread.

20. The system of claim 18, wherein said second thread state is the thread state of the processor during the execution of the second program thread.

21. The system of claim 18, wherein said processor switches between said first and second thread state by changing a state selection register.

22. The system of claim 18, wherein said hardware thread scheduler includes:
a thread identifier for identifying at least one hard-real-time (HRT) thread and at least one non-real-time (NRT) thread;
an HRT scheduler for regularly scheduling an HRT thread in available time quanta such that said HRT thread is scheduled to ensure the execution of the HRT thread in a predetermined time.

23. The system of claim 22, wherein said time quanta is at least one instruction cycle.

24. The system of claim 22, wherein said time quanta is exactly one instruction cycle.

25. The system of claim 22, wherein said hardware thread scheduler schedules an NRT thread to replace a scheduled HRT thread if said scheduled HRT is idle.

26. The system of claim 22, wherein said hardware thread scheduler schedules the execution of NRT threads in quanta not allocated to HRT threads.

27. The system of claim 26, wherein said hardware thread scheduler regularly schedules NRT threads to be executed.

28. The system of claim 22, further comprising:
a first storage device for storing program instructions, said processor fetching instructions from the first storage device within a first fetch period;
a second storage device for storing program instructions, said processor fetching instructions from the second storage device within a second fetch period;
wherein said first fetch period is substantially shorter than said second fetch period.

29. The system of claim 28, wherein said first storage device for storing program instructions comprises a static random access memory (RAM).

30. The system of claim 28, wherein said second storage device for storing program instructions comprises a flash memory.

31. The system of claim 18, wherein said processor is capable of restoring said second thread state of said processor during execution of said first program thread.

32. The system of claim 18, wherein said processor is capable of storing said second thread state of said processor during execution of said first program thread.

33. The system of claim 18, wherein said first set of data storage devices comprises registers shared by a plurality of threads.

34. The system of claim 18, wherein said thread selection hardware further:
communicates the context number associated with the instruction included in the second thread state to the execution pipeline; and
loads instructions from the second set of data storage devices into the execution pipeline.

35. A computer-based method for switching between program contexts in a multithreading pipelined processor having a hardware thread selector and an execution pipeline, the execution pipeline including a set of stages for executing instructions and configured to execute a single instruction at each different stage of the set of stages, the method comprising:
storing a first context of said pipelined processor in a first set of data storage devices, the first context corresponding to a first program thread;
storing a second context of said pipelined processor in a second set of data storage devices, the second context corresponding to a second program thread;
responsive to a predetermined fixed schedule allocating processing time to the first program thread and to the second program thread, switching the pipelined processor from executing the first program thread to executing the second program thread between the end of an execution cycle and before the beginning of a next consecutive execution cycle without using interrupts and without incurring a time penalty by coupling the execution pipeline from the first set of data storage devices to the second set of data storage devices via the hardware thread selector responsive to a context number associated with an instruction identifying the second set of data storage devices, said schedule specifying that the first program thread should be allocated processing time every first number of cycles and that the second program thread should be allocated processing time every second number of cycles, wherein said first number of cycles is not equal to said second number of cycles.

36. The method of claim 35, wherein the switching comprises changing a state selection register included in the hardware thread selector.

37. The method of claim 35, further comprising:
identifying which of said first and second program threads said processor executes according to the schedule.

38. The method of claim 37, further comprising:
allocating available processing time of the processor among at least the first and second threads according to the schedule.

39. The method of claim 38, wherein the allocating comprises dividing the available processing time into a plurality of quanta, each quanta corresponding to a number of instruction cycles for execution of a thread.

40. The method of claim 39, wherein at least one quantum corresponds to a thread that is scheduled to execute periodically after a fixed number of execution cycles.

41. The method of claim 37, wherein identifying further comprises identifying at least one hard-real-time (HRT) thread and at least one non-real-time (NRT) thread.

42. The method of claim 41, further comprising:
scheduling an HRT thread in available time quanta such that said HRT thread is scheduled to ensure the execution of the HRT thread in a predetermined time.

43. The method of claim 41, further comprising:
scheduling an NRT thread for a quantum allocated for an HRT thread if said HRT thread is idle.

44. The method of claim 41, further comprising:
scheduling NRT threads in quanta not allocated for HRT threads.

45. The method of claim 35, wherein switching the pipelined processor from executing the first program thread to executing the second program thread between the end of an execution cycle and before the beginning of a next consecutive execution cycle without using interrupts and without incurring a time penalty comprises:
communicating the context number associated with the instruction identifying the second set data storage devices to the execution pipeline; and
loading instructions from the second set of data storage devices into the execution pipeline.

46. A computer-based method for switching between program contexts in a multithreading pipelined processor having a hardware thread selector and an execution pipeline, the method comprising:
storing a first context of said processor in a first set of data storage devices comprising a first thread state corresponding to a first program thread;
storing a second context of said processor in a second set of data storage devices comprising a second thread state corresponding to a second program thread;
switching the processor directly from the first thread state to the second thread state without using interrupts and without incurring a time penalty by decoupling the execution pipeline from the first set of data storage devices and coupling the execution pipeline to the second set of storage devices via the hardware thread selector at a fixed time according to a predetermined fixed execution schedule and responsive to a context number associated with an instruction included in the second thread state identifying the second set of data storage devices, said predetermined fixed execution schedule specifying that the first thread should be allocated processing time every first number of cycles and that said second thread should be allocated processing time every second number of cycles, wherein said first number of cycles is not equal to said second number of cycles.

47. The method of claim 46, wherein the switching comprises changing a state selection register included in the hardware thread selector.

48. The method of claim 46, further comprising:
identifying which of the first and second program threads said processor executes according to a hard-real-time (HRT) execution schedule.

49. The method of claim 48, further comprising:
allocating available processing time of the processor among at least the first and second threads according to the predetermined fixed execution schedule.

50. The method of claim 49, wherein the allocating comprises dividing the available processing time into a plurality of quanta, each quanta corresponding to a number of instruction cycles for execution of a thread.

51. The method of claim 50, wherein at least one quantum corresponds to a thread that is scheduled to execute periodically after a fixed number of execution cycles.

52. The method of claim 48, wherein identifying further comprises identifying at least one hard-real-time (HRT) thread and at least one non-real-time (NRT) thread.

53. The method of claim 52, further comprising:
scheduling an HRT thread in available time quanta such that said HRT thread is scheduled to ensure the execution of the HRT thread within a predetermined time.

54. The method of claim 52, further comprising:
scheduling an NRT thread for a quantum allocated for an HRT thread if said HRT thread is idle.

55. The method of claim 52, further comprising:
scheduling NRT threads in quanta not allocated for HRT threads.

* * * * *